United States Patent [19]

Norris

[11] Patent Number: 4,706,872
[45] Date of Patent: Nov. 17, 1987

[54] METHOD OF BONDING COLUMBIUM TO NICKEL AND NICKEL BASED ALLOYS USING LOW BONDING PRESSURES AND TEMPERATURES

[75] Inventor: Brian Norris, San Diego, Calif.

[73] Assignee: Rohr Industries, Inc., Chula Vista, Calif.

[21] Appl. No.: 919,703

[22] Filed: Oct. 16, 1986

[51] Int. Cl.⁴ .................. B23K 1/04; B23K 35/32
[52] U.S. Cl. ....................... 228/194; 228/263.19
[58] Field of Search ............ 228/263.11, 263.19, 228/263.21, 194, 198, 227; 428/661, 662

[56] References Cited

U.S. PATENT DOCUMENTS

| | | | |
|---|---|---|---|
| 3,046,650 | 7/1962 | Heestand | 228/263.19 |
| 3,170,234 | 2/1965 | Tarr | 228/263.19 |
| 3,214,833 | 11/1965 | Erickson | 428/661 X |
| 3,290,773 | 12/1966 | Wohlberg et al. | 228/263.19 |
| 3,309,767 | 3/1967 | Sama | 228/227 X |
| 3,317,288 | 5/1967 | Marshall | 428/662 |
| 3,594,895 | 7/1971 | Hill | 428/662 X |
| 4,034,454 | 7/1977 | Galasso et al. | 228/194 X |
| 4,448,853 | 5/1984 | Fischer et al. | 228/263.11 |

*Primary Examiner*—Kenneth J. Ramsey
*Attorney, Agent, or Firm*—P. J. Schlesinger; J. M. Cantor; F. D. Gilliam

[57] ABSTRACT

The disclosure relates to a method of joining nickel and nickel based alloys to columbium at low pressure and low temperature, wherein a thin titanium brazing foil is provided, with or without a copper coating electroplated thereon. The layers or foils of the metals to be joined are placed in intimate contact with opposite sides of the brazing foil under pressure and heated in a vacuum to a temperature above the eutectic of the metals being used and below 2000° F. and preferably below 1950° F. to provide the bond.

6 Claims, 3 Drawing Figures

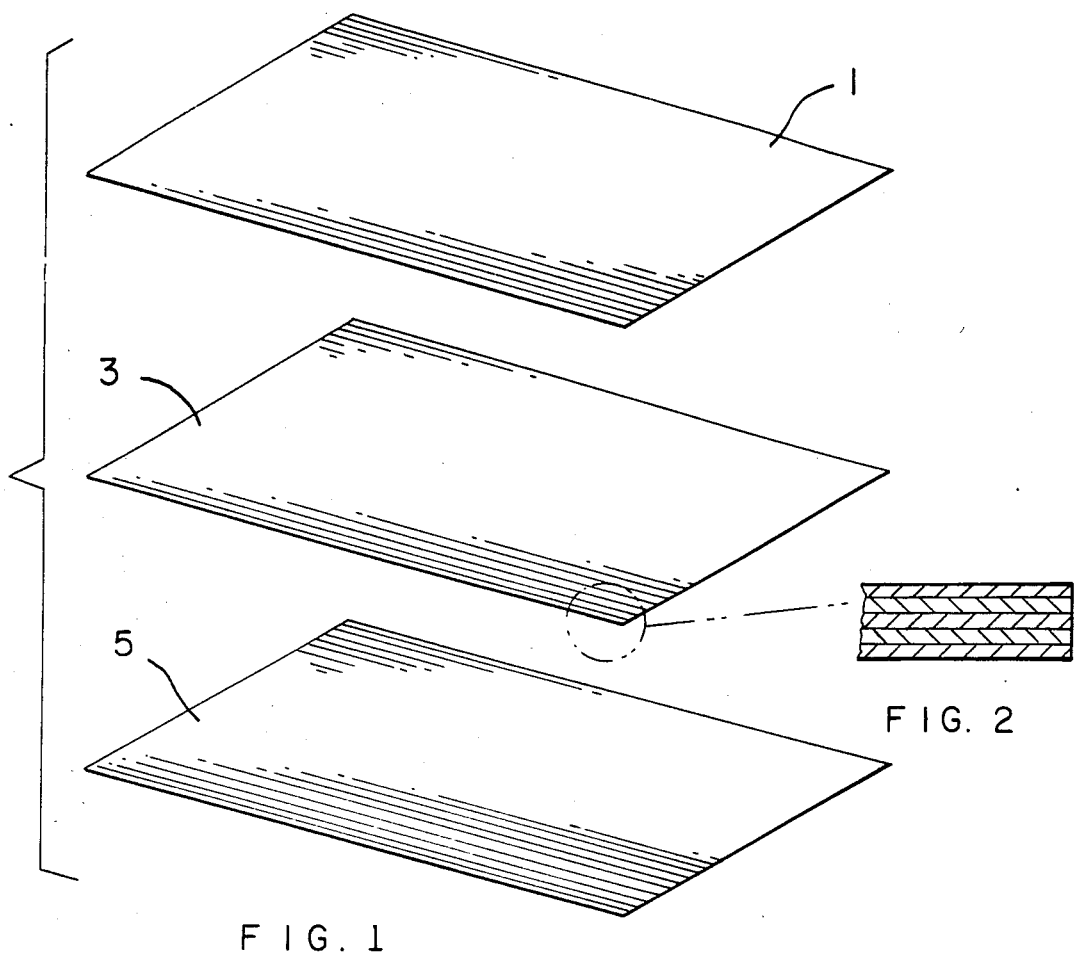
FIG. 1
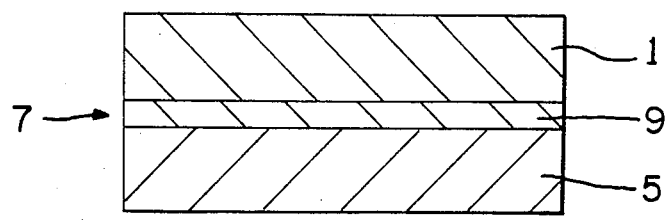
FIG. 2
FIG. 3

METHOD OF BONDING COLUMBIUM TO NICKEL AND NICKEL BASED ALLOYS USING LOW BONDING PRESSURES AND TEMPERATURES

BACKGROUND OF THE INVENTION

1. Field of the Invention

This invention relates to a method of joining columbium to to nickel and nickel based alloys and, more specifically, to a method of performing such joining under low pressure and low temperature conditions.

2. Brief Description of the Prior Art

Columbium (Cb) is a desirable material for use in environments requiring high temperature regimes (i.e., about 2000 to about 2500° F.), such as for use in thermal protection systems. However, a problem has existed in joining refractory metals to group VIII metals (iron, cobalt, nickel) because brittle intermetallic phases are formed. For example, the phases formed between columbium and nickel include Cb, CbNi, $CbNi_3$ and Ni. All of these phases have different crystal structures and, hence, elastic stresses exist between the phases. Subsequent relaxation of these stresses results in interphase cracks. In addition, CbNi and $CbNi_3$ are very hard brittle phases. In order to overcome the above noted problems, physical vapor deposited (P.V.D.) molybdenum and diffusion bonded palladium interlayers or P.V.D. molybdenum and P. V.D. tungsten interlayers have been used. Bonding was carried out for 1 to 60 minutes with a bonding pressure of 1.4 ksi in the temperature range 1651 to 2012° F. The interlayers prevented the formation of intermetallic phases and ensured that only solid solutions formed in the bonding zone. Such prior art is discussed in A. G. Fesenko et al., "Svar Proiz", 1978, No. 12, pgs. 16 to 18, translated in "Welding Production", December, 1979, 25(12), pgs. 18 to 21.

Fesenko's bonding method used a two element interlayer. This was done to provide a series of neighboring solid solutions through avoiding the intermetallics that would be formed if the one element interlayer (Mo) was used to bond columbium to nickel.

Fesenko introduced the molybdenum and tungsten interlayers using the expensive process of electron beam evaporation and deposition. The palladium was joined to the nickel using diffusion bonding. An important point to make is that P.V.D. coatings have to be used in order to avoid the formation of brittle cracks that had occurred in bonding using interlayers of the same metals in the form of strips and foil. This limits the practical application of this method (Mo and W cannot be electroplated). Another practical drawback is that the bonding was carried out in the solid state, and hence intimate contact and 100 percent bonding would cause problems. A final problem with regard to the Mo-Pd system is that there exists a depressed solidus/liquidus point (2258° F.) at 60 wt. percent Pd/40 wt. percent Ni if Pd dilution is not fully carried out, thereby causing local melting of the joined area to possibly occur at high service temperatures.

In bonding of columbium to nickel and nickel based alloys, the ideal interlayer material will (a) have a bonding temperature which does not exceed 2200° F. and a remelt temperature which exceeds 2500° F.; (b) provide continuous solid solutions throughout the bonded area; (c) produce no intermetallics or, if it does, the intermetallics will not be deleterious; (d) provide a thin interlayer material and a bonding cycle long enough for dilution to occur if the potential for intermetallics exists, resulting in solid solutions and the removal of the intermetallics from the bond region; (e) avoid galvanic couples; (f) have a coefficient of thermal expansion between that of Cb and Ni to reduce elastic stresses and cracking on thermal cycling; and (g) be a material which will not boil off under re-entry conditions.

Columbium is mutually soluble with several metals. The reactions with the nickel are very important as they indicate the compatibility of the interlayer metals surveyed, titanium being the best because (a) a large solid solubility range exists to accommodate titanium in nickel without the formation of intermetallics; (b) a low melting point eutectic exists between nickel and titanium (i.e., 1728' F.) to allow the use of low brazing temperatures with significant outdiffusion of the titanium into the bulk of the nickel which will increase the remelt temperature of the joint; and (c) titanium has a coefficient of thermal expansion between that of columbium and nickel.

SUMMARY OF THE INVENTION

In accordance with the present invention, the above problems of the prior art are overcome or substantially minimized and there is provided a unique, low temperature, low pressure method of joining columbium to nickel and nickel based alloys wherein low temperature bonding (below 2000° F. and preferably approximately 1950° F. and below) is possible due to a low melting point liquid phase that is produced between the nickel and an ultra thin (0.2 mils or less) commercially pure titanium or copper coated commercially pure titanium interlayer. The in-situ produced liquid phase allows the bonding process to be carried out at low pressure. Joint solidification is accomplished through furnace cooling, however isothermal solidification may be possible through judicious selection of bonding parameters. The method herein can be used in alternate thermal protection systems.

More specifically, in accordance with the present invention, columbium and preferably columbium sheet or foil is bonded to nickel and nickel based alloy and preferably sheet or foil thereof, such as Inconel 617, by placing a particular brazing foil therebetween prior to joining. The brazing foil is formed either of commercially pure titanium foil which is chemically etched to about 0.2 mil or less alone or with said foil electroplated with copper. The columbium and nickel are placed in intimate contact with the titanium foil on opposite sides thereof and under pressure. Bonding is carried out at under 2000° F. and preferably about 1950° F. or less for about 10 hours at 10 psi bonding pressure in a vacuum to provide the bond between the columbium sheet and the nickel member.

DESCRIPTION OF THE DRAWINGS

FIG. 1 is an exploded view of an arrangement to be brazed in accordance with the present invention;

FIG. 2 is a cross sectional view of the foil member 3 of FIG. 1; and

FIG. 3 is a cross-sectional view of the brazed product in accordance with the present invention.

DESCRIPTION OF THE PREFERRED EMBODIMENT

Referring now to FIG. 1, there is shown an exploded view of an arrangement for brazing a thin columbium sheet 1 to a sheet of nickel or nickel based alloy 5 and specifically, INCONEL 617. The sheets 1 and 5 are placed in intimate contact with opposite faces of a thin brazing foil 3. The brazing foil 3 is formed of titanium alone according to one embodiment of the invention and titanium onto which has been electrodeposited on both sides thereof a thin layer of copper, the latter being shown in FIG. 2. While the drawings show copper electroplated on the titanium foil, it should be understood that the titanium foil alone is the preferred embodiment herein with the difference being that a eutectic is formed at a higher temperature than when using the copper coated titanium but the coefficient of thermal expansion thereof being more desirable.

INCONEL 617, which is a standard nickel based alloy and is analogous to the sheet 5 of FIG. 1, was bonded to a foil of columbium, which is analogous to the sheet 1 of FIG. 1 in accordance with the present invention. The brazing foil 3 of FIG. 1 was formed by etching commercially pure titanium foil to a thickness of 0.2 mils. A portion of this foil was electroplated with copper in order to evaluate the use of a low temperature Ti-Cu-Ti ternary eutectic (1652° F.) brazing liquid as well as the TI-Ni binary eutectic liquid (1728° F.) produced with the bare commercially pure Ti foil. The commercially pure Ti foil and all Cb faying surfaces were abrasively cleaned with "Bright Boy" prior to bonding. Two mil columbium foil was bonded to 5 mil INCONEL 617 sheet using a 0.125 inch overlap joint. Bonding was carried out at 1950° F. for 2 hours at 10 psi bonding pressure. The specimens 7 as depicted in FIG. 3 showed substantial interdiffusion 9 between the columbium and the INCONEL 617. Remelt evaluations were carried out by heating strip specimens between buss bars in an evacuated bell jar. The remelt temperature was found to be 1800° F. An inspection of the as brazed samples indicated that the copper coated titanium foil produced excessive brazing liquid, thereby suggesting preferred thickness of less than 0.2 microns for such foil. In the case of the bare commercially pure titanium foil per se, the bond produced was satisfactory and a remelt temperature of up to 1800° F. was achieved. It is expected that higher remelt temperatures and/or removal of intermetallic phases are obtainable with thinner interlayers and/or longer diffusion times during processing.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A method of bonding columbium to nickel and nickel based allowys, comprising the steps of:
    (a) providing a first thin sheet of columbium,
    (b) providing a second member having a composition taken from the class consisting of nickel and nickel based alloys,
    (c) providing a brazing foil taken from the class consisting of titanium and copper coated titanium,
    (d) placing said first sheet and second member in intimate contact with opposite sides of said brazing foil,
    (e) heating the arrangement of (d) to a temperature above that of any eutectic which will form and below 2000° F., and
    (f) cooling the arrangement of (e) to ambient temperature.

2. The method of claim 1 wherein said brazing foil is copper coated titanium, said copper coating being formed by electroplating.

3. The method of claim 2 wherein said copper is electroplated on both sides of said brazing foil.

4. The method of claim 3 wherein said second member is a thin sheet.

5. The method of claim 2 wherein said second member is a thin sheet.

6. The method of claim 1 wherein said second member is a thin sheet.

* * * * *